(12) United States Patent  (10) Patent No.: US 7,533,070 B2
Guralnik et al.  (45) Date of Patent: May 12, 2009

(54) AUTOMATIC FAULT CLASSIFICATION FOR MODEL-BASED PROCESS MONITORING

(75) Inventors: Valerie Guralnik, Orono, MN (US); Wendy K. Foslien, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 360 days.

(21) Appl. No.: 11/442,857

(22) Filed: May 30, 2006

(65) Prior Publication Data

US 2007/0282777 A1 Dec. 6, 2007

(51) Int. Cl.
G06E 1/00 (2006.01)
G06E 3/00 (2006.01)
G06F 15/18 (2006.01)
G06G 7/00 (2006.01)
(52) U.S. Cl. .................................................. 706/16
(58) Field of Classification Search ................ None
See application file for complete search history.

(56) References Cited

U.S. PATENT DOCUMENTS

| | | | | |
|---|---|---|---|---|
| 4,945,478 | A * | 7/1990 | Merickel et al. | 382/131 |
| 5,449,604 | A * | 9/1995 | Schellenberg et al. | 435/6 |
| 6,214,550 | B1 | 4/2001 | Malins | 435/6 |
| 6,683,455 | B2 * | 1/2004 | Ebbels et al. | 324/309 |
| 6,711,615 | B2 * | 3/2004 | Porras et al. | 709/224 |
| 6,845,342 | B1 * | 1/2005 | Basser et al. | 702/183 |
| 6,925,389 | B2 * | 8/2005 | Hitt et al. | 702/19 |
| 7,029,441 | B2 * | 4/2006 | Dodds | 600/300 |
| 7,050,936 | B2 * | 5/2006 | Levy et al. | 702/181 |
| 7,080,290 | B2 * | 7/2006 | James et al. | 714/47 |
| 7,118,853 | B2 * | 10/2006 | Botstein et al. | 435/4 |
| 7,183,118 | B2 * | 2/2007 | Aebersold et al. | 436/173 |
| 7,191,106 | B2 * | 3/2007 | Minor et al. | 703/2 |
| 7,207,068 | B2 * | 4/2007 | Chaudhari et al. | 726/27 |
| 7,280,988 | B2 * | 10/2007 | Helsper et al. | 706/26 |
| 7,296,274 | B2 * | 11/2007 | Cohen et al. | 719/315 |
| 7,343,267 | B1 * | 3/2008 | Casler et al. | 702/189 |

(Continued)

OTHER PUBLICATIONS

Estivill-Castro et al. "Argument free clustering for large spatial point-data sets via boundary extraction from Delaunay Diagram" Computers, Environment and Urban Systems, 26 (2002) pp. 315-334.*

(Continued)

Primary Examiner—Michael B Holmes
(74) Attorney, Agent, or Firm—Kris T. Fredrick

(57) ABSTRACT

A computer implemented method, system and program product for automatic fault classification. A set of abnormal data can be automatically grouped based on sensor contribution to a prediction error. A principal component analysis (PCA) model of normal behavior can then be applied to a set of newly generated data, in response to automatically grouping the set of abnormal data based on the sensor contribution to the prediction error. Data points can then be identified, which are indicative of abnormal behavior. Such an identification step can occur in response to applying the principal component analysis mode of normal behavior to the set of newly generated data in order to cluster and classify the data points in order to automatically classify one or more faults thereof. The data points are automatically clustered, in order to identify a set of similar events, in response to identifying the data points indicative of abnormal behavior.

20 Claims, 6 Drawing Sheets

U.S. PATENT DOCUMENTS

| | | | |
|---|---|---|---|
| 7,379,880 B1 * | 5/2008 | Pathria et al. | 705/1 |
| 7,406,384 B2 * | 7/2008 | Li | 702/19 |
| 7,412,448 B2 * | 8/2008 | Agarwal et al. | 707/10 |
| 7,437,766 B2 * | 10/2008 | Cohen et al. | 726/26 |
| 7,448,084 B1 * | 11/2008 | Apap et al. | 726/24 |
| 2005/0141782 A1 | 6/2005 | Guralnik et al. | 382/276 |

OTHER PUBLICATIONS

Review of data mining clustering techniques to analyze data with high dimensionality as applied in gene expression data (Jun. 2008)Aouf, M.; Lyanage, L.; Hansen, S.; Service Systems and Service Management, 2008 International Conference on Jun. 30, 2008-Jul. 2, 2008 pp. 1-5 Digital Object Identifier 10.1109/ICSSSM.2008. 4598505.*

Abnormal behavior detection and behavior matching for networked cameras Ermis, E.B.; Saligrama, V.; Jodoin, P.-M.; Konrad, J.; Distributed Smart Cameras, 2008. ICDSC 2008. Second ACM/IEEE International Conference on Sep. 7-11, 2008 pp. 1-10 Digital Object Identifier 10.1109/ICDSC.2008.4635728.*

SIR Model Application of Cyclist Characteristic in Urban Mixed Traffic Ye Hong-xia; Zhang Xiu-yuan; Wu Jian-wei; Management Science and Engineering, 2006. ICMSE '06. 2006 International Conference on Oct. 5-7, 2006 pp. 2148-2152 Digital Object Identifier 10.1109/ICMSE.2006.314147.*

Spatio-temporal analysis of constitutive exocytosis in epithelial cells Sebastian, R.; Diaz, M.-E.; Ayala, G.; Letinic, K.; Moncho-Bogani, J.; Toomre, D.; Computational Biology and Bioinformatics, IEEE/ACM Transactions on vol. 3, Issue 1, Jan.-Mar. 2006 pp. 17-32 Digital Object Identifier 10.1109/TCBB.2006.11.*

Phenotypic-Specific Gene Module Discovery using a Diagnostic Tree and caBIG VISDA Yitan Zhu; Zuyi Wang; Yuanjian Feng; Jianhua Xuan; Miller, D.J.; Hoffman, E.P.; Yue Wang; Engineering in Medicine and Biology Society, 2006. EMBS '06. 28th Annual International Conference of the IEEE Aug. 2006 pp. 5767-5770.*

Review of data mining clustering techniques to analyze data with high dimensionality as applied in gene expression data (Jun. 2008) Aouf, M.; Lyanage, L.; Hansen, S.; Service Systems and Service Management, 2008 International Conference on Jun. 30, 2008-Jul. 2, 2008 pp. 1-5 Digital Object Identifier 10.1109/ICSSSM.2008. 4598505.*

A new fault detection and diagnosis method based on principal component analysis in multivariate continuous processes Yang Yinghua; Lu Ningyun; Wang Fuli; Ma Liling; Intelligent Control and Automation, 2002. Proceedings of the 4th World Congress on vol. 4, Jun. 10-14, 2002 pp. 3156-3160 vol. 4.*

A grid-based HIV expert system Sloot, P.M.A.; Boukhanovsky, A.V.; Keulen, W.; Boucher, C.A.; Cluster Computing and the Grid, 2005. CCGrid 2005. IEEE International Symposium on vol. 1, May 9-12, 2005 pp. 471-486 vol. 1 Digital Object Identifier 10.1109/CCGRID. 2005.1558592.*

Performance Analysis of Feature Extraction Schemes for Artificial Neural Network Based ECG Classification Ghongade, R.; Ghatol, A.A.; Conference on Computational Intelligence and Multimedia Applications, 2007. International Conference on vol. 2, Dec. 13-15, 2007 pp. 486-490 Digital Object Identifier 10.1109/ICCIMA.2007. 221.*

Nonparametric data-driven control loop assessment and diagnosis Ling, B.; Dong, S.; Venkataraman, U.; Control Loop Assessment and Diagnosis, 2005. The IEE Seminar on (Ref. No. 2005/11008) Jun. 16, 2005 pp. 43-50.*

Criterion Functions for Document Clustering, Experiments and Analysis; Y. Zhao, G. Karypis; University of Minnesota, Dept. of Computer Science; Army HPC Research Center; Technical Report #01-40.

A.C. Loui, A. Savakis; Automated Event Clustering and Quality Screening of Consumer Pictures for Digital Albuming; IEEE Transactions on Multi-media, vol. 5, No. 3, Sep. 2003.

Q. P He, S. J. Qin, J. Wang; A New Fault Diagnosis Method Using Fault Directions in Fisher Discriminant Analysis; AIChE Journal, vol. 51, No. 2, Feb. 2005.

PCT—Notification of Transmittal of the International Search Report and the Written Opinion of the International Searching Authority, or the Declaration, Date of Mailing Apr. 2, 2008.

* cited by examiner

AUTOMATIC FAULT CLASSIFICATION FOR MODEL-BASED PROCESS MONITORING

TECHNICAL FIELD

Embodiments are generally related to data-processing systems and methods. Embodiments are also related to automatic fault classification and principal component analysis (PCA).

BACKGROUND

Early event detection (EED) systems are designed to assist the operations team by providing early warnings of approaching process upsets. EED systems use multivariate statistics and pattern recognition algorithms to monitor continuous time-series data to provide early warning of operational shifts that may drive a system into a hazardous state. The core of an EED system is a set of state estimators that embed monitoring algorithms. These algorithms use time series process data to assess the health of the monitored process. Although numerous state estimators exist, such as Principal Component Analysis (PCA), that are able to detect abnormality, the challenge lies in the translation of their output into information that is meaningful to the process operator. Currently, EED systems are designed to detect anomalies. While capable of detecting various anomalies, these applications are only able to localize some predefined failure conditions. The result is a significant dependence on manual event localization and knowledge and expertise of process operator. The automation of fault localization is a necessary element in reducing dependence on human operators.

Principal Component Analysis (PCA) is a technique of choice for many EED systems. PCA models transform a set of correlated process measurements into a set of uncorrelated variables. Most process monitoring methods look for excursions in the Q statistic, a measure of prediction error, as a means of detecting abnormal behavior. The Q statistic alone does not directly identify the source of the problem, but the individual sensor residuals are indicative of the nature of the fault. The pattern of sensor residuals can be used to more precisely identify the source of the abnormal process behavior.

An example of a fault classification by principal component analysis is discussed in U.S. Patent Application Publication No. 20050141782 by Guralnik et al which is entitled "Principal Component Analysis Based Fault Classification" and is incorporated herein by reference in its entirety. In U.S. Patent Application Publication No. 20050141782 Principal Component Analysis (PCA) is used to model a process, and clustering techniques are used to group excursions representative of events based on sensor residuals of the PCA model. The PCA model is trained on normal data, and then run on historical data that includes both normal data, and data that contains events. Bad actor data for the events can be identified by excursions in Q (residual error) and $T^2$ (unusual variance) statistics from the normal model, resulting in a temporal sequence of bad actor vectors. Clusters of bad actor patterns that resemble one another are formed and then associated with events.

A straightforward way to represent each individual excursion as a point in N-dimensional space, where N is the number of sensors used to model the process. The contributions of each sensor to Q statistics or $T^2$ can be expressed through weights of the vector. Unfortunately, this representation can potentially lead to poor clustering results. This is because a process is usually measured by large number of sensors, while each fault is usually caused by only a small part of the process. Therefore, if residuals of all sensors are used to represent excursions, the resulting clustering solution may be distorted by sensors unrelated to the detected faults.

One of the limitations of existing clustering approaches is that they do not take into account the closeness of data points' time of occurrence as an indication of belonging to the same event and possibly to the same cluster. These algorithms also fail to take into account special characteristics of each abnormality and noise in the data, and thus can result in incorrect decisions, which may to lead to the generation of clusters that do not represent event definitions.

It is therefore believed that a need exists for an improved method and/or system for overcoming these problems. Such methods and/or systems are discussed in greater detail herein.

BRIEF SUMMARY

The following summary is provided to facilitate an understanding of some of the innovative features unique to the embodiments and is not intended to be a full description. A full appreciation of the various aspects of the embodiments disclosed can be gained by taking the entire specification, claims, drawings, and abstract as a whole.

It is, therefore, one aspect of the present invention to provide for improved data-processing methods and systems.

It is another aspect of the present invention to provide for the automatic construction of a library of faults through clustering and classification of PCA model outputs, wherein PCA is utilized to model the normal operation of a monitored process.

It is yet another aspect of the present invention to provide an improved data-processing method and system that can be used as a part of an abnormal situation management product offering.

It is a further aspect of the present invention to provide for a system and method for the automation of fault localization to reduce dependence on human operators.

The aforementioned aspects of the invention and other objectives and other objectives and advantages can now be achieved as described herein. A computer implemented method, system and program product for automatic fault classification is disclosed. In general, a set of abnormal data can be automatically grouped based on sensor contribution to a prediction error, such as Q statistics or $T^2$. A principal component analysis (PCA) model can be utilized to identify abnormal behavior.

Data points can then be identified, which are indicative of abnormal behavior. Such an identification step can occur in response to applying the principal component analysis mode of normal behavior to the set of newly generated data in order to cluster and classify the data points in order to automatically classify one or more faults thereof. The data points can be automatically clustered, in order to identify a set of similar events, in response to identifying the data points indicative of abnormal behavior.

A clustering algorithm can be utilized for grouping the set of abnormal data based on the sensor contribution to the prediction error. The clustering algorithm can be implemented, for example, in the context of a three phase clustering algorithm, which produces an event classifier for classifying one or more faults.

During the first phase of such a three phase clustering algorithm, the data points can be grouped based on their proximity in time resulting in one or more clusters representative of a single event. During a second phase of the three phase clustering algorithm, an event cluster can be partitioned into a plurality of sub-clusters, wherein each sub-cluster among the plurality of sub-clusters represents a state within a single event. During the third phase of three phase clustering algorithm, an agglomerative hierarchical algorithm can be utilized, for example, to determine at least one cluster by repeatedly combining together the plurality of sub-clusters across all events. Again, it can be appreciated that use of a specific agglomerative hierarchical algorithm in this context is indicated herein for general illustrative purposes, and is not considered a limiting feature of the invention. An agglomerative clustering algorithm is useful because such an algorithm automatically efficiently (e.g., iteratively) determines the number of clusters based on stopping clustering criteria. Other types of algorithms may also be implemented, depending upon design considerations. Examples of various types of clustering criteria are described in "Criterion Functions for Document Clustering, Experiments and Analysis," Ying Zhao and George Karypis, University of Minnesota, Department of Computer Science, Army HPC Research Center, Minneapolis, Minn., 55455, Technical Report #01-40, Feb. 21, 2002, which is incorporated herein by reference in its entirety.

The method, system and program product described herein can be based on a computer implemented technique for automatically constructing a library of faults through clustering and classification of principal component analysis (PCA) model outputs, wherein PCA models the normal operation of the monitored process.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the principles of the disclosed embodiments.

DETAILED DESCRIPTION

The particular values and configurations discussed in these non-limiting examples can be varied and are cited merely to illustrate at least one embodiment and are not intended to limit the scope of the invention.

Figure 1:
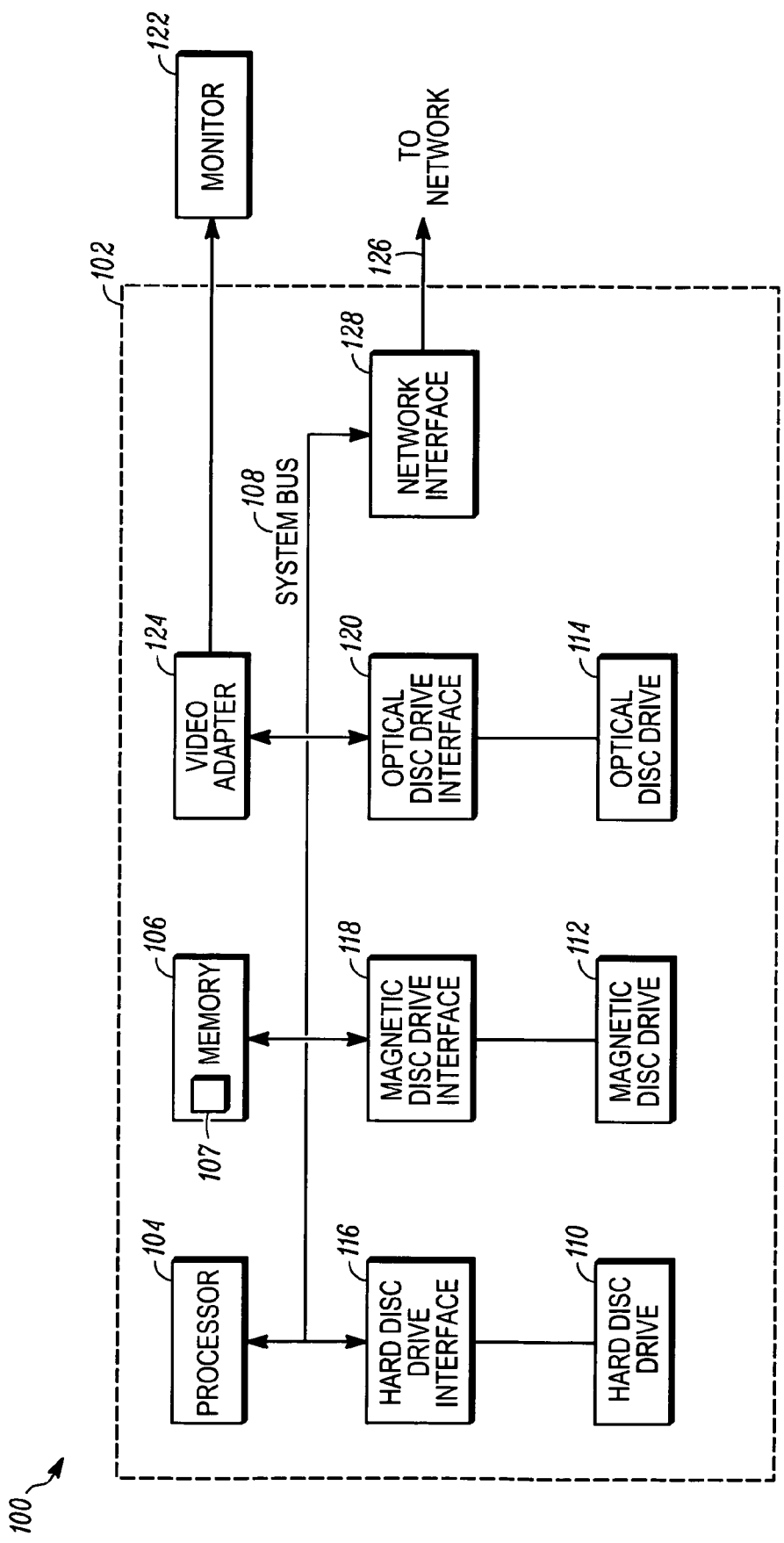
FIG. 1 illustrates a block diagram of a computer system, which can be adapted for use in implementing a preferred embodiment.

FIG. 1 illustrates a block diagram of a data-processing apparatus 100, which can be utilized to implement a preferred embodiment. Data-processing apparatus 100 can implement the present invention as described in greater detail herein. Data-processing apparatus 100 can be configured as a general purpose computing device, such as a computer 102. The data-processing apparatus 100 generally includes a processing unit 104, a memory 106, and a system bus 108 that operatively couples the various system components to the processing unit 104. One or more processing units 104 operate as either a single central processing unit (CPU) or a parallel processing environment.

The data-processing apparatus 100 further includes one or more data storage devices for storing and reading program and other data. Examples of such data storage devices include a hard disk drive 110 for reading from and writing to a hard disk (not shown), a magnetic disk drive 112 for reading from or writing to a removable magnetic disk (not shown), and an optical disc drive 114 for reading from or writing to a removable optical disc (not shown), such as a CD-ROM or other optical medium. A monitor 122 is connected to the system bus 108 through an adapter 124 or other interface. Additionally, the computer arrangement or data-processing apparatus 100 can include other peripheral output devices (not shown), such as speakers and printers.

The hard disk drive 110, magnetic disk drive 112, and optical disc drive 114 are connected to the system bus 108 by a hard disk drive interface 116, a magnetic disk drive interface 118, and an optical disc drive interface 120, respectively. These drives and their associated computer-readable media provide nonvolatile storage of computer-readable instructions, data structures, program modules, and other data for use by the data-processing apparatus 100. Note that such computer-readable instructions, data structures, program modules, and other data can be implemented as a module 107.

Note that the embodiments disclosed herein can be implemented in the context of a host operating system and one or more module(s) 107. In the computer programming arts, a software module can be typically implemented as a collection of routines and/or data structures that perform particular tasks or implement a particular abstract data type.

Software modules generally comprise instruction media storable within a memory location of a data-processing apparatus and are typically composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. The term module, as utilized herein can therefore refer to software modules or implementations thereof. Such modules can be utilized separately or together to form a program product that can be implemented through signal-bearing media, including transmission media and recordable media.

It is important to note that, although the embodiments are described in the context of a fully functional data-processing apparatus 100 such as a computer, those skilled in the art will appreciate that the mechanisms of the present invention are capable of being distributed as a program product in a variety of forms, and that the present invention applies equally regardless of the particular type of signal-bearing media utilized to actually carry out the distribution. Examples of signal bearing media include, but are not limited to, recordable-type media such as floppy disks or CD ROMs and transmission-type media such as analogue or digital communications links.

Any type of computer-readable media that can store data that is accessible by a computer, such as magnetic cassettes, flash memory cards, digital versatile discs (DVDs), Bernoulli cartridges, random access memories (RAMs), and read only memories (ROMs) can be used in connection with the embodiments.

A number of program modules, such as, for example, module 107, can be stored or encoded in a machine readable medium such as the hard disk drive 110, the, magnetic disk drive 114, the optical disc drive 114, ROM, RAM, etc or an electrical signal such as an electronic data stream received through a communications channel. These program modules can include an operating system, one or more application programs, other program modules, and program data.

The data-processing apparatus 100 can operate in a networked environment using logical connections to one or more remote computers (not shown). These logical connections are implemented using a communication device coupled to or integral with the data-processing apparatus 100. The data sequence to be analyzed can reside on a remote computer in the networked environment. The remote computer can be another computer, a server, a router, a network PC, a client, or a peer device or other common network node. FIG. 1 depicts the logical connection as a network connection 126 interfacing with the data-processing apparatus 100 through a network interface 128. Such networking environments are commonplace in office networks, enterprise-wide computer networks, intranets, and the Internet, which are all types of networks. It will be appreciated by those skilled in the art that the network connections shown are provided by way of example and that other means of and communications devices for establishing a communications link between the computers can be used.

PCA models can be utilized to transform a set of correlated process measurements into a set of uncorrelated variables. It can be appreciated that PCA is merely one statistical technique that can be utilized for process monitoring. It can be appreciated that other process monitoring techniques may be utilized in place of or in addition to PCA. For example, other process monitoring models may be utilized in the context of a model of normal behavior, a prediction error (or other statistics) indicative of process abnormality and the contribution of process variables toward prediction error. Although the disclosed embodiments are described with respect to PCA, other processing modeling techniques can also apply, and PCA is merely one example of a processing monitoring technique.

Most process monitoring methods look for excursions in the Q statistic or $T^2$, a measure of prediction error, as a means of detecting abnormal behavior. The Q statistic alone does not directly identify the source of the problem, but the individual sensor residuals are indicative of the nature of the fault. The pattern of sensor residuals can be used to more precisely identify the source of the abnormal process behavior. To differentiate the causes of the problem, a clustering algorithm that groups abnormal data based on sensor contribution to the prediction error is developed.

Figure 2:
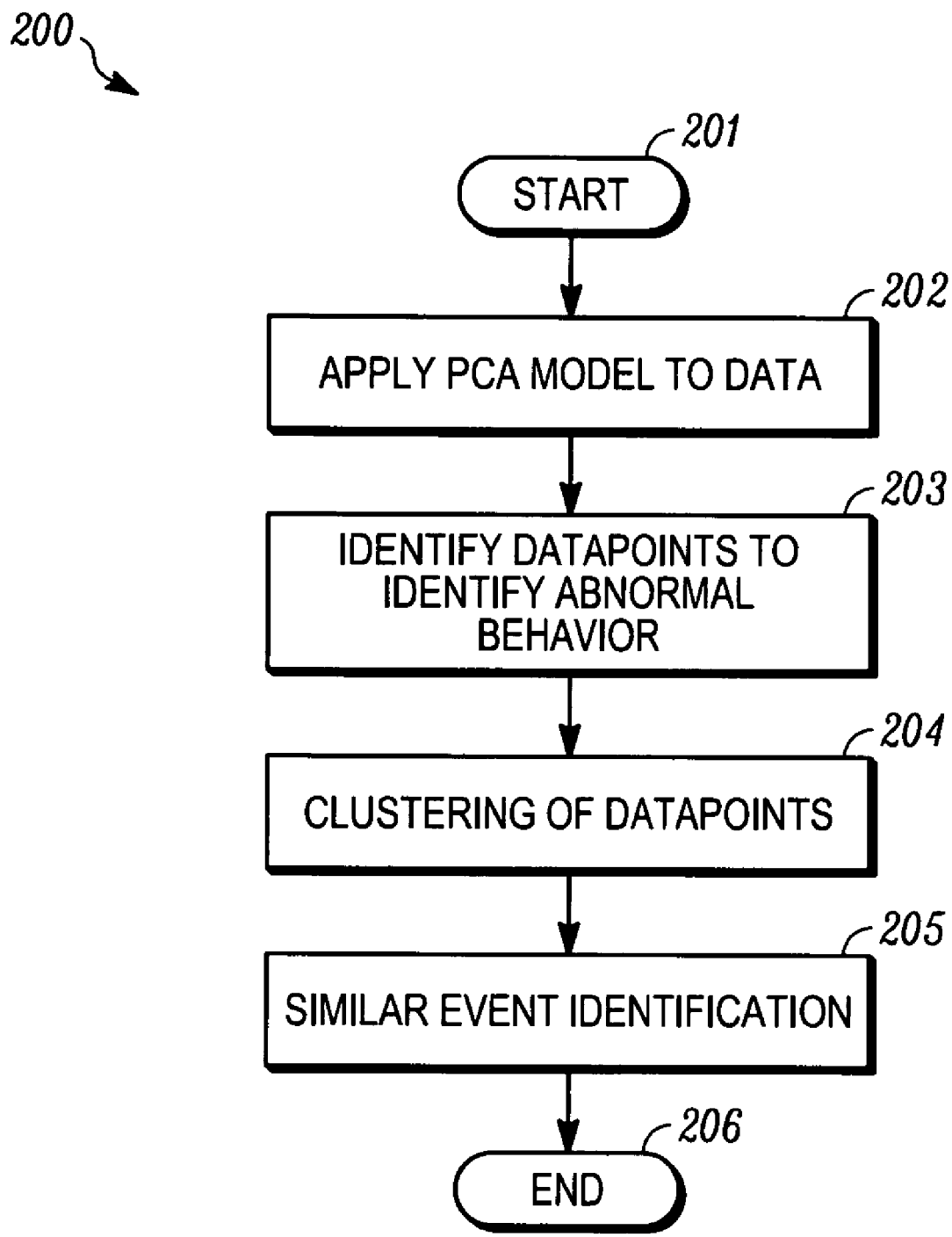
FIG. 2 illustrates a flow chart of operations illustrating logical operational steps for automatic event identification in accordance with a preferred embodiment.

FIG. 2 illustrates a general flow chart 200 of operations illustrating logical operational steps for automatic event identification in accordance with a preferred embodiment. Note the process depicted in FIGS. 2, 3, 4, 5, and 6 can be implemented via a software module such as, for example, module 107 depicted in FIG. 1 in association with the data-processing apparatus 100. The process begins as depicted at block 201. Next, as indicated at block 202 a PCA model of normal behavior for a system/process is applied to a set of data. During the PCA modeling application, particular data points among the data set can be identified and utilized to identify abnormal behavior associated with the system/process as indicated at block 203. These data points can then be clustered as indicated at block 205 to identify similar events. One possible technique for identify such similar invents involves searching for clusters of patterns. The process can then terminate as indicated at block 206.

One of the limitations of existing clustering approaches is that they do not take into account of closeness of data point's time of occurrence as indication of them belonging to the same event and possibly to the same cluster. These algorithms fail to take into account special characteristics of each abnormality and noise in the data, and thus make incorrect decisions resulting in clusters that do not represent event definitions. These challenges can be addressed by developing a clustering algorithm, which may be referred to as an "Event Classifier".

Figure 3:
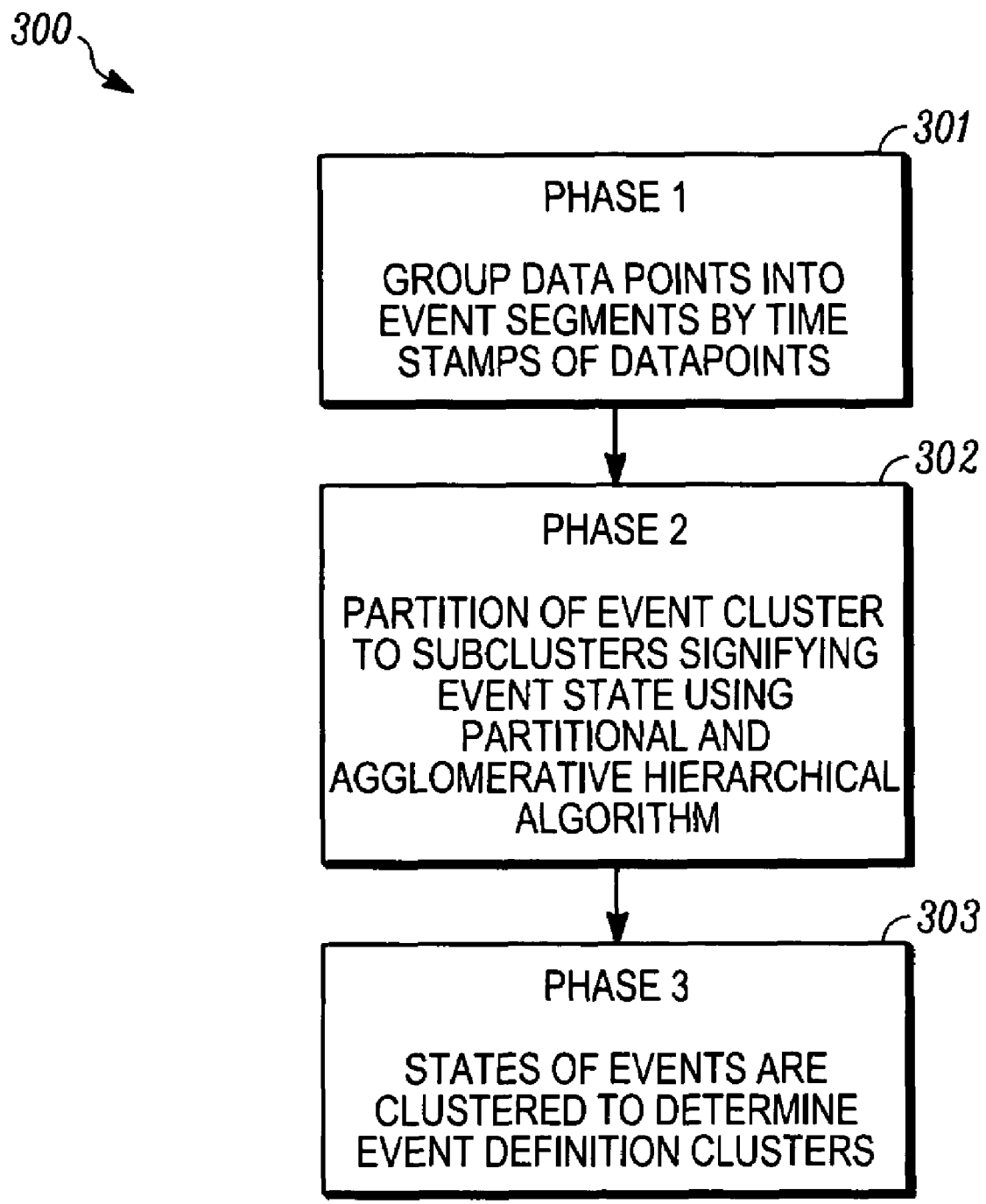
FIG. 3 illustrates a flow chart of operations illustrating logical operational steps for a three phase clustering algorithm called event classifier in accordance with a preferred embodiment.

FIG. 3 illustrates a high-level flow chart 300 of operations illustrating logical operational steps for implementing a three phase clustering algorithm in accordance with a preferred embodiment. As indicated at block 301, a phase 1 operation can be implemented in which data-points are grouped into even segments via time stamps associated with particular data-points. Next, as indicated at block 302, a phase 2 operation can be performed in which an event cluster is partitioned into sub-clusters signifying event states using algorithms such as, but not limited to, time-series segmentation algorithms. Partitional and/or agglomerative hierarchical algorithms may also be utilized, depending upon design considerations. Thereafter, as indicated at block 305, the states of all events can be clustered to determine a set of event definitions clusters.

Figure 4:
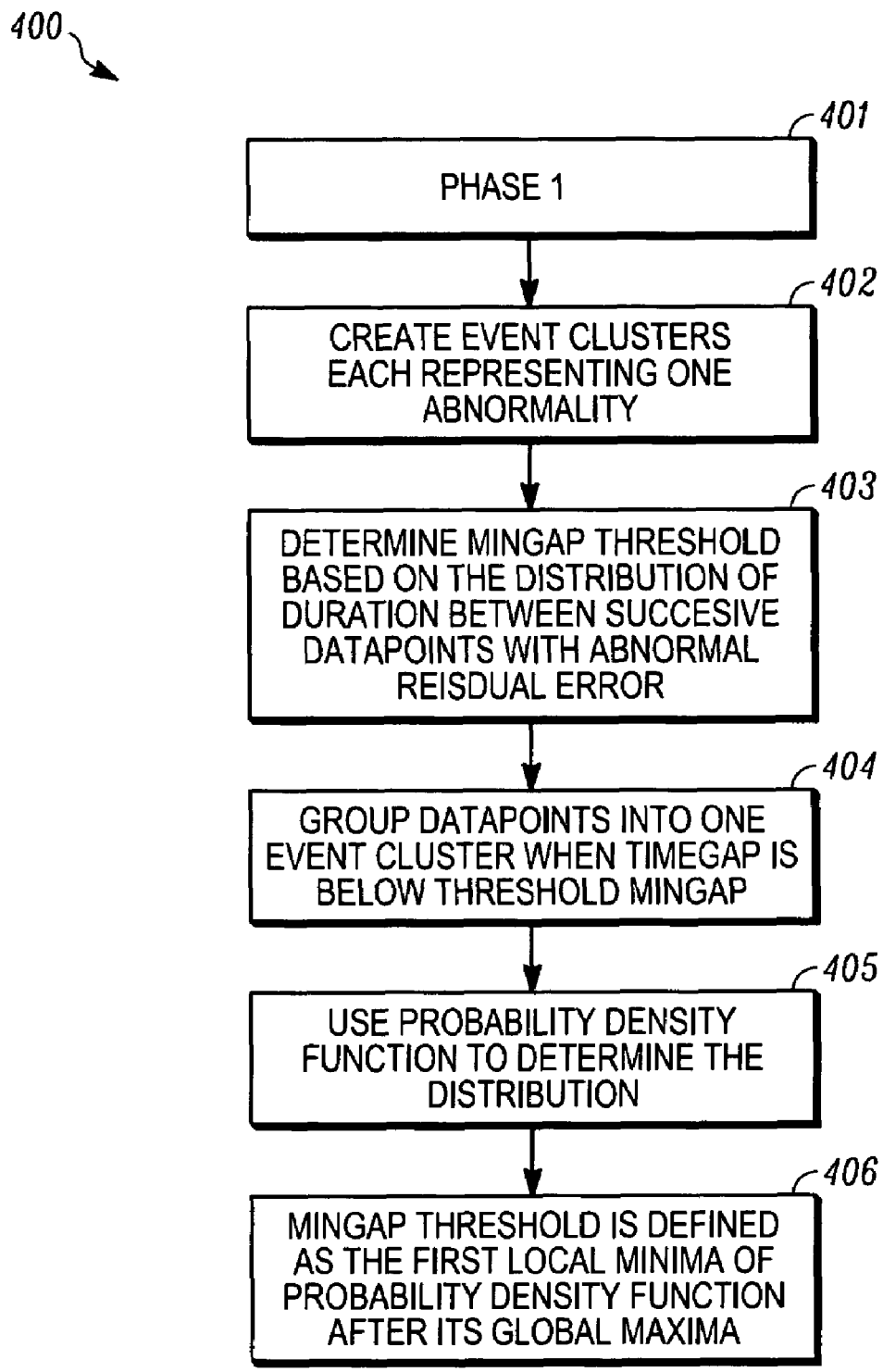
FIG. 4 illustrates a flow chart of operations illustrating logical operational steps of phase 1 of event classifier in accordance with a preferred embodiment.

FIG. 4 illustrates a flow chart 400 of operations illustrating logical operational steps of phase 1 in accordance with a preferred embodiment. The phase 1 process can begin, as indicated at block 401. During the first phase event clusters are created, such that each cluster represents one or more abnormalities as depicted at block 402. A straightforward technique for achieving this is to group into one cluster all consecutive data points determined abnormal by the PCA model. For example, such a threshold can be the difference between their timestaps, wherein such a difference is equal to the sampling rate. In some cases, however, statistics indicative of abnormal behavior may oscillate around a threshold, resulting in gaps between data points from the same event. This usually happens at the beginning of the events. Moreover, in some applications such as health vehicle monitoring a communication loss can result in gaps between data readings.

The approach described herein generally involves determining the MINGAP threshold and then grouping data points into abnormal events based on the MINGAP threshold. Thus, as indicated at block 403, an operation can be processed in which the MINGAP threshold is determined based on the distribution of duration between successive data points with an abnormal residual error. Thereafter, as depicted at block 404, the data points can be grouped into one even cluster when the time gap is below the threshold gap determined previously as indicated at block 403.

The MINGAP threshold is determined as depicted at block 403 based on the distribution of duration between successive data points with abnormal residual error. A probability density function is utilized as illustrated at block 405, which is essentially a smoothed histogram of sensor readings, to determine the distribution. The MINGAP threshold can be defined as the first local minima of probability density function after its global maxima as described at block 406. The key idea behind this approach is that if there are gaps between readings that belong to the same events, these gaps will occur infrequently and the peak of probability density function happens around the sampling rate. The next local minima can provide a grace period for those readings that possess a small gap between them.

Figure 5:
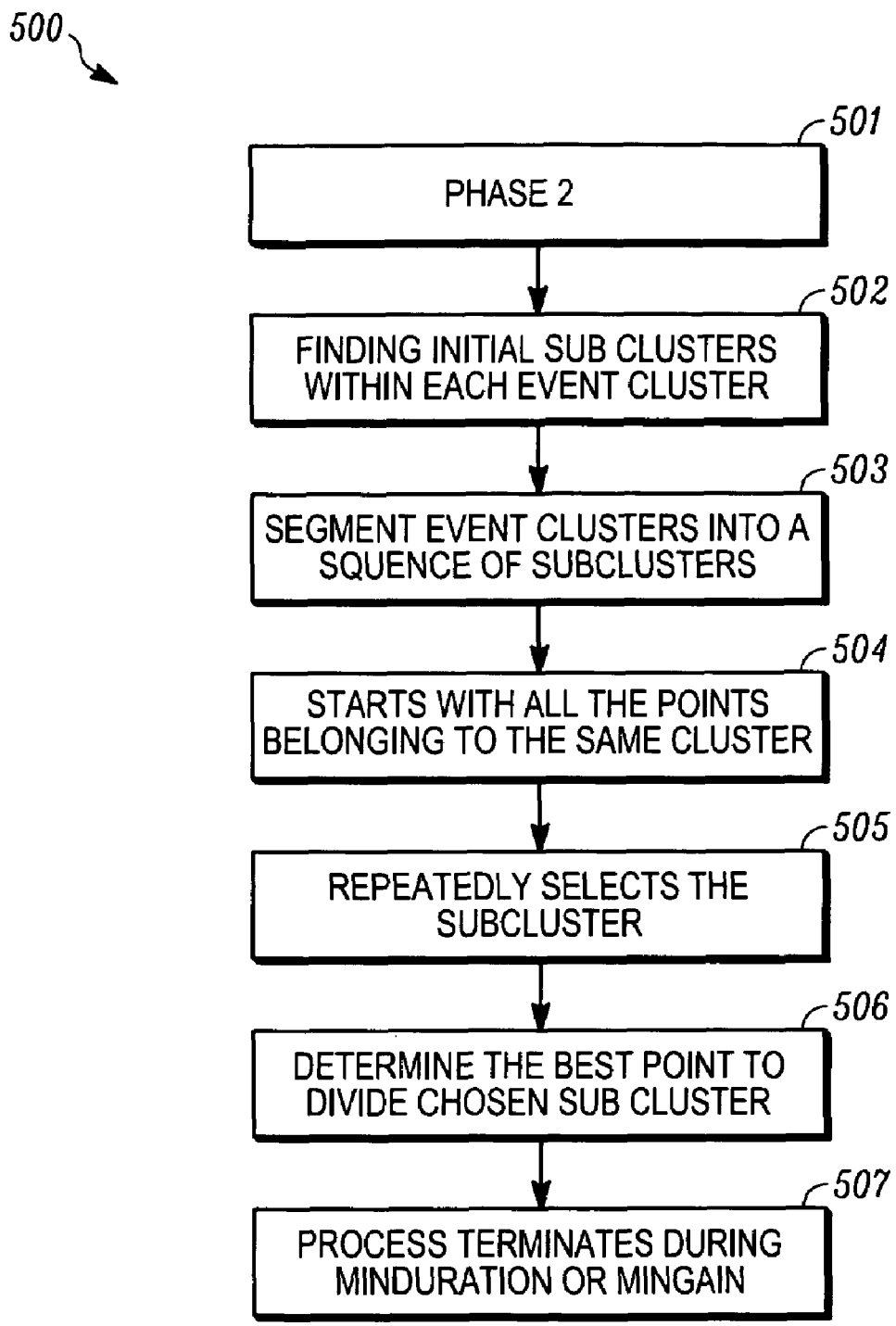
FIG. 5 illustrates a flow chart of operations illustrating logical operational steps of phase 2 of event classifier in accordance with a preferred embodiment.

FIG. 5 illustrates a flow chart 500 of operations illustrating logical operational steps of phase 2, to determine initial sub-clusters within each event classifier in accordance with a preferred embodiment. As depicted at block 501, the phase 2 operation begins. As illustrated next at block 502, an operation can be processed in order to identify initial sub-clusters within each even cluster. Next, as illustrated at block 503, event clusters are segmented into a sequence of sub-clusters. The found segments represent states within each event. This segmentation approach is analogous to time series segmentation approaches. However, instead of optimizing a cost function this approach optimizes clustering criteria, such as maximizing the overall similarity of each sub-cluster.

The Event Classifier can obtain the initial set of sub-clusters as follows. The process begins with all the points belonging to the same cluster as depicted at block 504. Then, the process repeatedly selects a sub-cluster as indicated at block 505 with the smallest clustering criterion among a current set of sub-clusters and determines the best point to divide a selected sub-cluster as indicated at block 506. The process can then terminate as depicted at block 507 when one of the smaller sub-clusters spans a time period shorter than a specified time period called MINDURATION. Increases in the resulting clustering criterion can also be negligible and below a certain threshold MINGAIN. The gain (e.g., MINGAIN) can be defined in terms of the successive difference between successive clustering criterion functionality.

MINDURATION and MINGAIN are examples of stopping criteria that can be implemented in the context of one particular embodiment. It can be appreciated that other types of criteria may also be utilized, depending upon design considerations and the goals of the particular embodiment. MINDURATION and MINGAIN are mentioned for illustrative purposes only and are not considered limiting features of the present invention. Metrics other than MIDURATION and MINGAIN can be utilized as stopping criteria (e.g., a predetermined number of clusters).

The MINDURATION and MINGAIN control the granularity of sub-clustering solutions. In general, MINDURATION is preferably set to a value that is smaller than the duration of the states in each event. At the same time, both MINDURATION and MINGAIN should be sufficiently large so that most of the sub-clusters allow evaluating the pattern of sensor residuals in each potential state in a meaningful way. The top-down method described above never makes changes in the break points it has once set. The inflexibility of this method is potentially, but not necessarily, a weak point, since it can turn out later in the process that early decisions are far from optimal. This problem is addressed by dynamically moving the break points using a procedure similar to iterative refinement in time-series segmentation problems. Other time-segmentation techniques can be used to ensure optimal partitioning.

Figure 6:
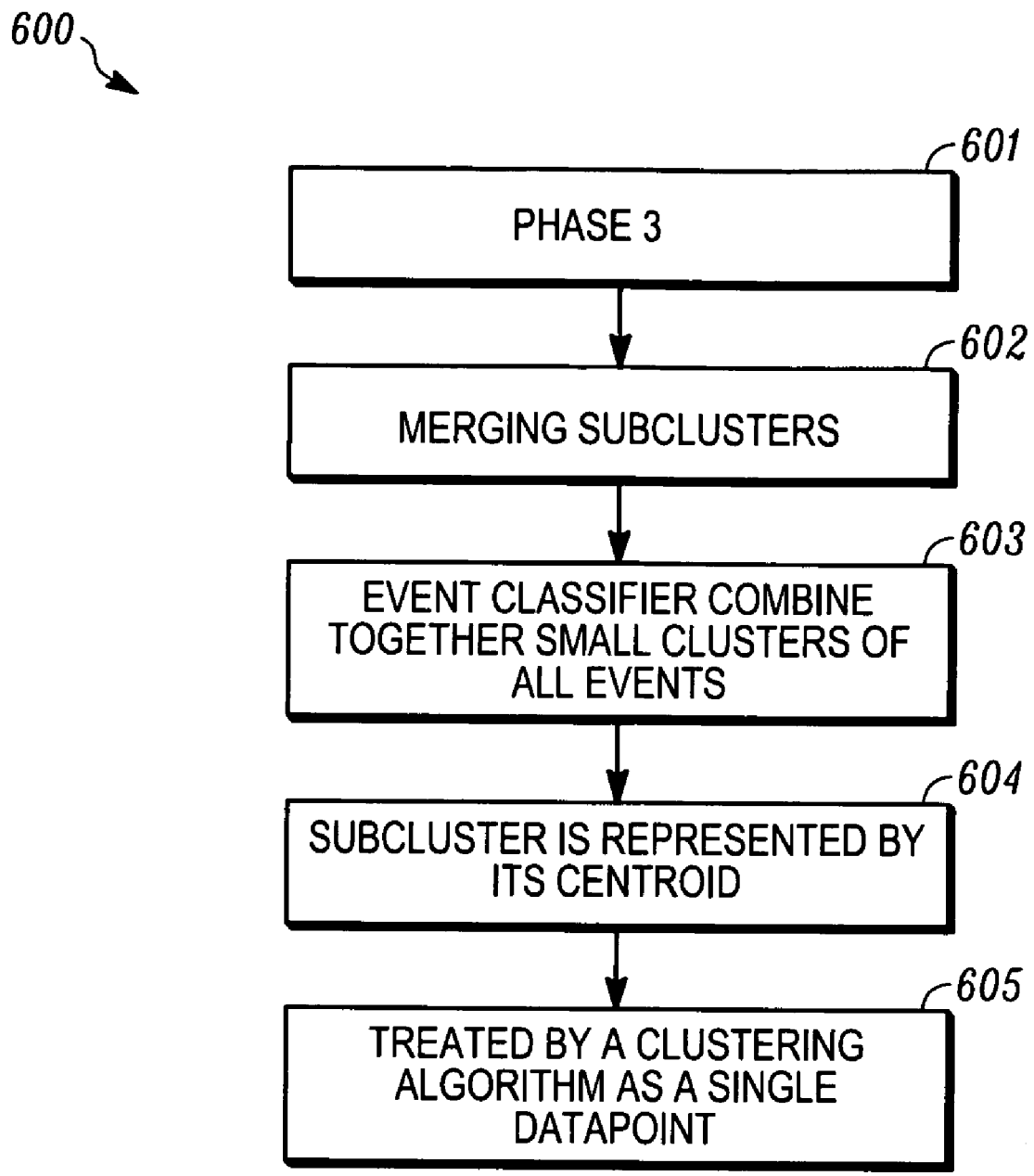
FIG. 6 illustrates a flow chart of operations illustrating logical operational steps of phase 3 of event classifier in accordance with a preferred embodiment.

FIG. 6 illustrates a flow chart 600 of operations illustrating logical operational steps of phase 3, in accordance with a preferred embodiment. The process can begin, as indicated at block 601. As indicated at block 602, sub-clusters can be merged. Next, as indicated at block 603, small sub-clusters of all events can be combined together. Thereafter, as indicated at block 604, each sub-cluster can be represented by its respective centroid as then, as depicted at block 605, treated by a clustering algorithm as a single data point. This representation allows downplaying the significance of individual outliers in sub-clusters as they will be outweighed by other data points in the sub-cluster. Note that this particular is step not necessary, but can be practiced for the outlined reasons. Any clustering approach can be used in this phase. For example, an agglomerative hierarchical clustering algorithm can be utilized. Other types of algorithms may also be implemented. Regardless of the type of algorithm utilized, the algorithm preferably terminates when the gain a clustering criteria is minimal. This approach allows for the dynamic determination of number of clusters based on the underlying data rather than specifying that number in advance.

Based on the foregoing it can be appreciated that the disclosed embodiments generally describe an ability to classify faults based on their characteristics for fault localization automation. Such embodiments describe a technique and/or system for automatically constructing a library of faults through clustering and/or classification of PCA model outputs, wherein the PCA utilized models the normal operation of a monitored process. The embodiments can be utilized as part of an Early Event Detection (EED) system for assisting an operations team by providing early warnings of approaching process upsets. The embodiments can be utilized as part of an Abnormal Situation Management (ASM) product offering. It can be appreciated, however, that EED has applicability in numerous domains that involve real-time diagnosis to off-line analysis, such as, for example, vehicle health monitoring.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A computer implemented method, comprising:
   applying a statistical model to a set of data in order to identify data points within set of data that are indicative of abnormal behavior; and
   thereafter automatically clustering said data points utilizing a three-phase clustering algorithm that produces an event classifier for classifying at least one fault among said data points, thereby providing for the automatic construction of a library of faults for use in an early detection system.

2. The method of claim 1 wherein said statistical model comprises Principal Component Analysis (PCA).

3. The method of claim 1 wherein during a first phase of said three-phase clustering algorithm all data points among said set of data belonging to a same event are grouped together in order to produce a set of event clusters.

4. The method of claim 3 wherein said data points are clustered based on a time proximity.

5. The method of claim 4 further comprising determining said time proximity utilizing a probability density function by calculating a distribution value.

6. The method of claim 3 wherein during a second phase of said three-phase clustering algorithm said event cluster is segmented into a plurality of sub-clusters representing a single event in order to determine an event state in each event thereof.

7. The method of claim 6 wherein said event cluster is segmented into said plurality of sub-clusters utilizing a time-segmentation calculation and an optimization of clustering criteria.

8. The method of claim 7 further comprising segmenting said event cluster by:
   repeatedly selecting a cluster with a most non-optimized clustering criterion among a current set of clusters; and
   determining an optimal location for dividing a sub-cluster for segmentation into said plurality of sub-clusters.

9. The method of claim 8 further comprising:
terminating said segmentation of said event cluster when a smallest sub-cluster spans a time period shorter than a specified time period.

10. The method of claim 8 further comprising:
terminating said segmentation of said event cluster when a gain in a resulting clustering criterion is negligible and below a particular threshold in order to improve a resulting segmentation thereof.

11. The method of claim 3 wherein during a third phase of said three-phase algorithm at least one genuine cluster is determined by repeatedly combining together said plurality of sub-clusters across all events in order for the states of all events to be clustered in order to determine a set of event definitions.

12. The method of claim 11 wherein each sub-cluster is represented by a centroid and treated as a single data point.

13. The method of claim 12 wherein an agglomerative hierarchical algorithm is utilized to determine said at least one genuine cluster.

14. A system, comprising:
a data-processing apparatus;
a module executed by said data-processing apparatus, said module and said data-processing apparatus being operable in combination with one another to:
apply a statistical model to a set of data in order to identify data points within set of data that are indicative of abnormal behavior; and
thereafter automatically cluster said data points utilizing a three-phase clustering algorithm that produces an event classifier for classifying at least one fault among said data points, thereby providing for the automatic construction of a library of faults for use in an early detection system.

15. The system of claim 14 wherein said statistical model comprises Principal Component Analysis (PCA).

16. A program product residing in a computer, comprising:
instruction media residing in a computer memory for applying a statistical model to a set of data in order to identify data points within set of data that are indicative of abnormal behavior; and
instruction media residing in a computer memory for thereafter automatically clustering said data points utilizing a three-phase clustering algorithm that produces an event classifier for classifying at least one fault among said data points, thereby providing for the automatic construction of a library of faults for use in an early detection system.

17. The program product of claim 16 wherein said statistical model comprises Principal Component Analysis (PCA).

18. The program product of claim 16 wherein during a first phase of said three-phase clustering algorithm all data points among said set of data belonging to a same event are grouped together in order to produce an event cluster.

19. The program product of claim 16 wherein during a second phase of said three-phase clustering algorithm said event cluster is segmented into a plurality of sub-clusters representing a single event in order to determine an event state in each event thereof.

20. The program product of claim 16 wherein during a third phase of said three-phase algorithm at least one genuine cluster is determined by repeatedly combining together said plurality of sub-clusters across all events in order for the states of all events to be clustered in order to determine a set of event definitions.

* * * * *